(12) United States Patent
Muto et al.

(10) Patent No.: US 7,509,949 B2
(45) Date of Patent: Mar. 31, 2009

(54) VAPORIZED FUEL PROCESSING DEVICE AND VEHICLE WITH THE SAME

(75) Inventors: Nobuharu Muto, Ibaraki (JP); Hiroya Tagami, Ibaraki (JP); Hideki Matsumoto, Saitama (JP); Naomasa Kaneko, Saitama (JP); Tadahisa Nakamura, Saitama (JP); Shinya Murabayashi, Saitama (JP); Junichi Koseki, Saitama (JP); Daisuke Sato, Saitama (JP); Toshiaki Nakai, Saitama (JP)

(73) Assignees: Kyosan Denki Co., Ltd., Ibaraki (JP); Honda Motor Co., Ltd., Tokyo (JP)

( * ) Notice: Subject to any disclaimer, the term of this patent is extended or adjusted under 35 U.S.C. 154(b) by 861 days.

(21) Appl. No.: 10/781,681

(22) Filed: Feb. 20, 2004

(65) Prior Publication Data

US 2004/0163718 A1  Aug. 26, 2004

(30) Foreign Application Priority Data

Feb. 20, 2003  (JP)  ............... P.2003-042059

(51) Int. Cl.
*F02M 33/04*  (2006.01)
*F02M 33/02*  (2006.01)

(52) U.S. Cl. ................... 123/519; 137/587

(58) Field of Classification Search ........ 123/516, 123/518, 519, 520, 198 D, 198 DB; 137/43, 137/493, 587–589
See application file for complete search history.

(56) References Cited

U.S. PATENT DOCUMENTS

| | | | | |
|---|---|---|---|---|
| 5,497,800 A | * | 3/1996 | Ohashi et al. | ............... 137/110 |
| 5,579,742 A | * | 12/1996 | Yamazaki et al. | ........... 123/520 |
| 5,584,278 A | * | 12/1996 | Satoh et al. | .................. 123/516 |
| 5,640,993 A | * | 6/1997 | Kasugai et al. | ............... 137/587 |
| 5,680,848 A | * | 10/1997 | Katoh et al. | ................. 123/518 |
| 6,029,635 A | * | 2/2000 | Sekine et al. | ............... 123/516 |
| 6,058,970 A | | 5/2000 | Osaki et al. | |
| 6,343,590 B1 | * | 2/2002 | Nagai et al. | ................. 123/518 |
| 6,415,772 B1 | * | 7/2002 | Yoshioka et al. | ............ 123/518 |
| 2001/0004890 A1 | * | 6/2001 | Shimamura et al. | ......... 123/516 |

FOREIGN PATENT DOCUMENTS

| | | |
|---|---|---|
| JP | 09-014059 A | 1/1997 |
| JP | 11-037007 | 2/1999 |
| JP | 2000-054918 A | 2/2000 |
| JP | 2001-020810 A | 1/2001 |

* cited by examiner

*Primary Examiner*—Mahmoud Gimie
(74) *Attorney, Agent, or Firm*—Arent Fox LLP

(57) ABSTRACT

A vaporized fuel processing device attached to a fuel tank, includes a casing for forming an outer shell of the vaporized fuel processing device, a diaphragm valve unit opened at the time of increasing the pressure in the fuel tank, and a vent passage communicating with atmospheric air. In the vaporized fuel processing device, the diaphragm valve unit is disposed in a space formed in the casing.

16 Claims, 5 Drawing Sheets

VAPORIZED FUEL PROCESSING DEVICE AND VEHICLE WITH THE SAME

BACKGROUND OF THE INVENTION

1. Field of the Invention

The present invention relates to a vaporized fuel processing device provided on a path through which a fuel tank and a canister communicate with each other, and a vehicle with the vaporized fuel processing device. Particularly, it relates to a vaporized fuel processing device and a vehicle with the same in which a diaphragm valve unit opened at the time of increasing the pressure in a fuel tank is provided in a space inside a casing and in which a vent passage is provided to communicate with the space to improve the degree of freedom in selecting an installation position of the vent passage.

2. Description of the Related Art

An automobile or the like is provided with a fuel tank for reserving fuel to be supplied to a combustion chamber of an engine. The fuel tank has a vent system provided to allow air to come in and go out according to increase/decrease in fuel amount in the tank. The vent system is a system through which the inside of the fuel tank and a canister communicate with each other. In the case where the fuel tank is overcharged, the canister is disabled from being used because the canister is wetted with over flow fuel delivered to the canister. Therefore, a vaporized fuel processing device is provided on the top of the fuel tank so that the vent system can be interrupted to prevent air and fuel from being delivered to the canister when the tank is filled up.

Such a vaporized fuel processing device according to the related art is shown in FIGS. 5 and 6. A vaporized fuel processing device 1 is provided on the top of a fuel tank 2. A vent passage 14 is provided for connecting the vaporized fuel processing device 1 to a canister 5 for adsorbing fuel vapor. When the pressure of fuel vapor produced in the fuel tank 2 reaches a predetermined value at the time of refueling, a diaphragm valve 9 of a diaphragm valve unit 8 is opened because of a pressure difference. As a result, the fuel vapor flows into the canister 5 through the vent passage 14, so that the fuel vapor is adsorbed into an adsorbing agent in the canister 5 so as to be temporarily adsorptively reserved in the canister 5. When the internal combustion engine then revolves, the fuel vapor adsorbed into the canister 5, as well as atmospheric air taken in through an air intake pipe 6 attached to the canister 5, is sucked in on the basis of the negative pressure of a suction pipe not shown, and delivered from a vapor outlet pipe 7 to a cylinder of the internal combustion engine through the suction pipe.

The operation of the vaporized fuel processing device 1 according to the related art at the time of refueling will be described with reference to FIG. 6. When refueling starts in the condition that a filler cap 4 is opened, atmospheric air is fed to a back pressure chamber 11 of the diaphragm valve unit 8 through a pipe 13 opening into a feed pipe 3. The pressure in the fuel tank 2 increases as a result of refueling. The diaphragm valve 9 of the diaphragm valve unit 8 is opened upward from a second valve seat 16 on the basis of a pressure difference due to increase in the pressure in the fuel tank 2. Fuel vapor flows into the canister 5 through the vent passage 14 and is reserved in the canister 5. For this reason, the fuel vapor is prevented from being released from the feed pipe 3 to the atmospheric air.

A valve body 17 is formed on a top surface of a float 12 of the vaporized fuel processing device 1. When the float 12 moves up, the valve body 17 eventually abuts on a first valve seat 15 disposed above the float 12. Specifically, as refueling continues through the feed pipe 3, the liquid level of fuel in the fuel tank 2 rises. When the liquid level of fuel reaches the float 12, the fuel pushes the float 12 up. When the liquid level of fuel reaches a predetermined position, the valve body 17 on the top surface of the float 12 abuts on the first valve seat 15. Because the vent passage 14 is blocked when the valve body 17 abuts on the first valve seat 15, the pressure in the fuel tank 2 increases further to cause the refueling to stop automatically. On this occasion, the liquid level of fuel reaches a full-tank position (e.g., see Japanese Patent Laid-Open No. 37007/1999).

The vaporized fuel processing device shown in FIGS. 5 and 6, however, has the following problems. That is, in the vaporized fuel processing device according to the related art, the vent passage 14 is provided so as to communicate with an opening 18 which is provided with the second valve seat 16 and below the diaphragm valve 9 disposed horizontally. For this reason, the vent passage 14 must be inevitably extended horizontally, so that the vaporized fuel processing device lacks the degree of freedom in the layout for installation, for example, because the vaporized fuel processing device has to protrude from the top of the fuel tank.

Furthermore, since the surface area of the vaporized fuel processing device revealed from the top of the fuel tank is large, the shape of the vaporized fuel processing device is too poor to reduce the amount of hydrocarbon (hereinafter referred to as HC) transmitted from the fuel tank.

In addition, since the vent passage 14 must be inevitably extended horizontally, in the case where part of fuel in the fuel tank 2 leaks from the opening 18 into the vent passage 14 because of tilting etc. of a vehicle, the leakage fuel causes a harmful influence on the canister 5, thereby resulting in deterioration of the canister 5 due to the leakage fuel flowing up to the canister 5.

SUMMARY OF THE INVENTION

It is an object of the invention to provide a vaporized fuel processing device and a vehicle with the vaporized fuel processing device, in which a diaphragm valve unit opened at the time of increasing the pressure in a fuel tank is disposed in a space formed in a casing of the vaporized fuel processing device to make it possible to attain improvement in the degree of freedom in selecting an installation position of a vent passage 14 and reduction in the amount of leakage fuel and the amount of HC transmitted to the outside.

In order to achieve the object, the invention employs the following configuration.

The invention provides a vaporized fuel processing device attached to a fuel tank, including a casing for forming an outer shell of the vaporized fuel processing device, a diaphragm valve unit opened at the time of increasing the pressure in the fuel tank, and a vent passage communicating with atmospheric air, wherein: the diaphragm valve unit is disposed in a space formed in the casing; and the vent passage communicates with the space.

With this configuration, the vent passage communicating with the canister can be installed in any position in the space, so that the degree of freedom in selecting the installation position is improved. Even if part of fuel in the fuel tank leaked out from an opening because of tilting etc. of a vehicle, the leakage fuel can be prevented from flowing up to the canister.

Preferably, the vaporized fuel processing device according to the invention may be disposed in the fuel tank. With this configuration, the amount of HC which is contained in fuel and which is transmitted through a wall of the vaporized fuel processing device so as to escape to the outside can be reduced as well as the amount of protrusion of the vaporized fuel processing device from the top of the fuel tank can be reduced.

Preferably, in the invention, the casing may include a flange provided for attaching the casing to the fuel tank. With this configuration, the flange for attaching the casing to the fuel tank can be installed in any upper or lower position in the casing, so that the degree of freedom in selecting the installation position is improved.

Preferably, in the invention, a fuel cut valve may be mounted in the space. With this configuration, the fuel cut valve can be installed in any position in a lower portion of the space, so that the degree of freedom in selecting the installation position is improved.

Preferably, in the invention, a fuel cut valve may be mounted in the vent passage. With this configuration, the degree of freedom in selecting the installation position of the fuel cut valve is improved. In addition, since the installation position of the fuel cut valve can be set at a position higher than the position of a liquid level detecting valve, the pressure in the fuel tank can be properly adjusted by the fuel cut valve even in the case where the fuel tank is filled up with fuel.

DETAILED DESCRIPTION OF THE INVENTION

FIRST EMBODIMENT

Figure 1:
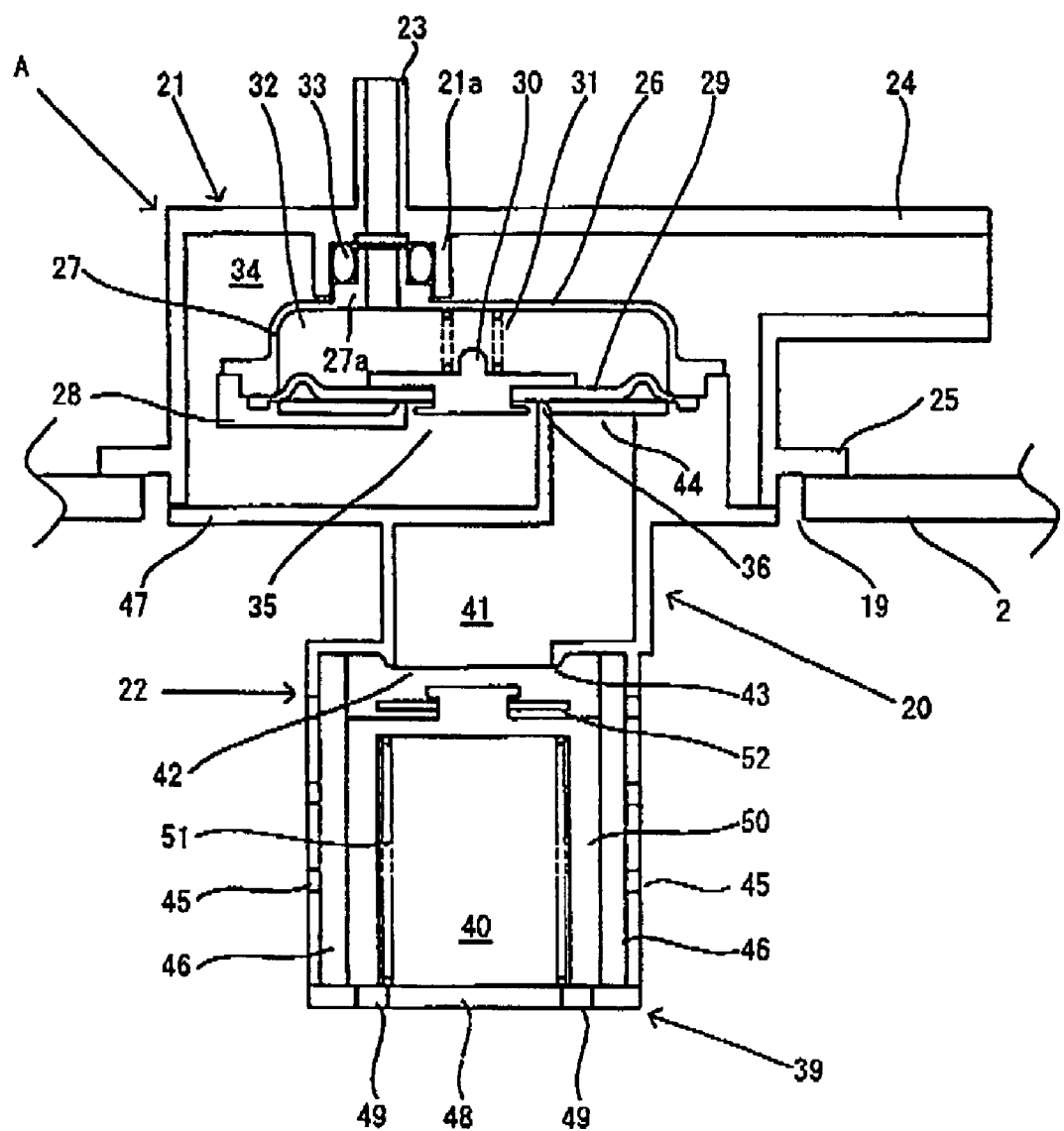
FIG. 1 is a sectional view showing a vaporized fuel processing device according to a first embodiment of the invention.

FIG. 1 shows a vaporized fuel processing device according to a first embodiment of the invention. The vaporized fuel processing device shown in FIG. 1 is of the type in which a vent passage is extended horizontally from a space where a diaphragm valve unit is stored.

The vaporized fuel processing device A is disposed on a communication hole 19 formed at the top of a fuel tank 2. The fuel tank 2 is made of resin. The vaporized fuel processing device A is connected to a top surface of the fuel tank 2 by means of thermal welding or the like so as to be integrated with the fuel tank 2.

Alternatively, the fuel tank 2 may be made of metal. In this case, the vaporized fuel processing device A may be integrally connected to the fuel tank 2 by screwing or the like.

The vaporized fuel processing device A has a casing 20 which is placed on the top of the fuel tank 2 and which forms an outer shell of the vaporized fuel processing device A. The casing 20 has upper and lower casing portions 21 and 22 made of resin.

Figure 5:
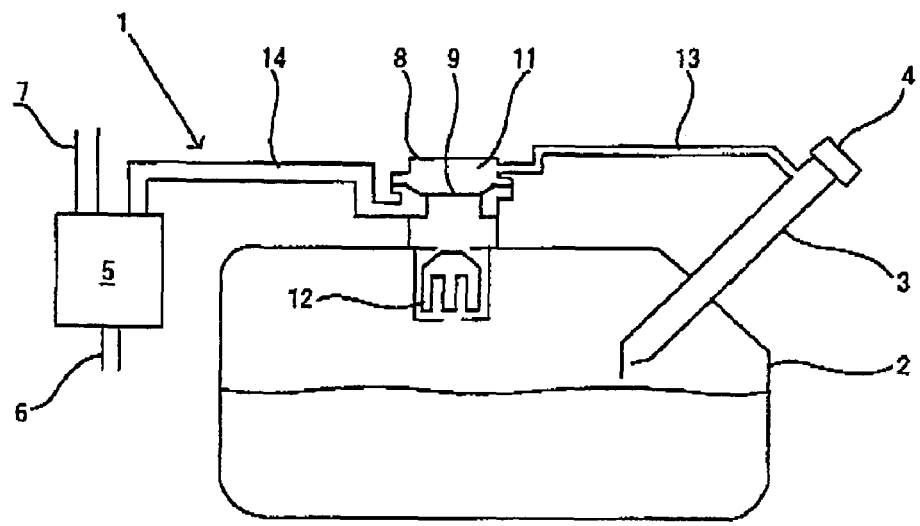
FIG. 5 is a schematic diagram of a system including a vaporized fuel processing device according to the related art.
Figure 6:
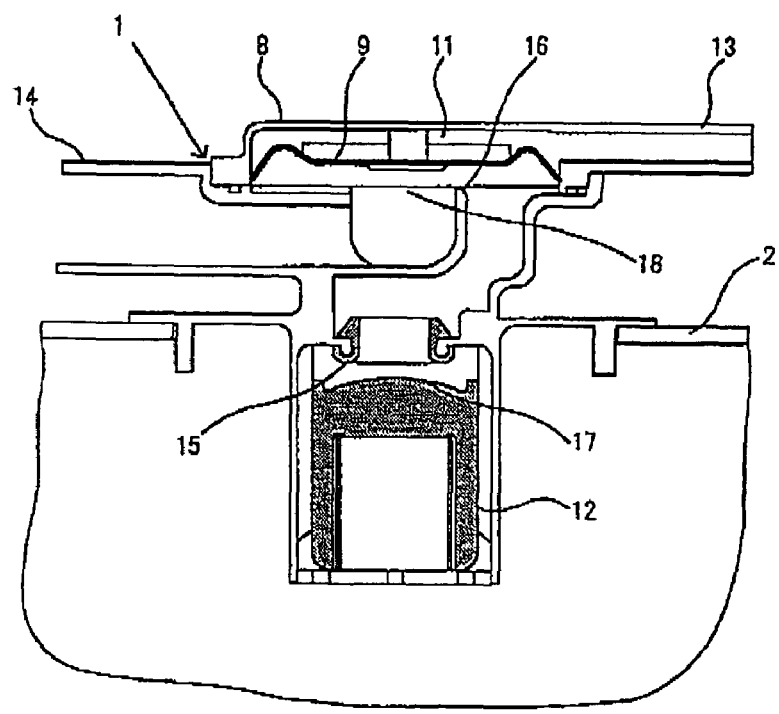
FIG. 6 is a sectional view showing a vaporized fuel processing device according to the related art.

The upper casing portion 21 is shaped like a hollow cylinder opened downward. A space 34 is formed in the inside of the upper casing portion 21, so that a diaphragm 15 valve unit 26 which will be described later is disposed so as to be stored in the space 34. A vertical pipe 23 which communicates with a feed pipe 3 shown in FIG. 5 is integrally connected to the top of the upper casing portion 21. A vent passage 24 which communicates with a canister 5 also shown in FIG. 5 is formed horizontally so as to be integrated with the upper casing portion 21. A flange 25 is further integrally attached to a lower portion of a side wall of the upper casing portion 21 so as to extend horizontally. The flange 25 is mounted on the top surface of the fuel tank 2 to block the communication hole 19.

The diaphragm valve unit 26 is disposed so as to be stored in the space 34 of the upper casing portion 21. The diaphragm valve unit 26 has an upper wall 27, a lower wall 28, a diaphragm valve 29, a support member 30, and a spring 31. A cylindrical portion 27a is integrally formed on the top of the upper wall 27. With interposition of a packing 33, the cylindrical portion 27a is inserted in a cylindrical body 21a integrally suspended from an inner surface of the upper casing portion 21. Thus, the upper casing portion 21 and the diaphragm valve unit 26 are integrally connected to each other.

The lower wall 28 is a member which is integrally formed on an upper end of the lower casing portion 22. The lower wall 28 has a third opening 35 provided in its center, and a second valve seat 36 around the third opening 35. An outer circumferential portion of the lower wall 28 is integrally attached to an open end of the upper wall 27. The diaphragm valve 29 is a circular flexible member. The support member 30 for supporting an end of the spring 31 is mounted in the center of the diaphragm valve 29, The diaphragm valve 29 is sandwiched between the upper wall 27 and the lower wall 28 when the two walls 27 and 28 are mounted. After the diaphragm valve 29 is sandwiched between the walls 27 and 28, the spring 31 is interposed between the support member 30 and the inner surface of the upper casing portion 21. As a result, the diaphragm valve 29 pushed down by the action of the spring 31 abuts on the second valve seat 36 formed in the lower wall 28, so that a back pressure chamber 32 is formed between the upper wall 27 and the diaphragm valve 29.

As a result, after the cylindrical portion 27a on the top of the upper wall 27 and the cylindrical body 21a in the inner surface of the upper casing portion 21 are attached to each other with interposition of the packing 33 while the upper wall 27 and the lower wall 28 are mounted in the condition that the diaphragm valve 29 is sandwiched between the upper wall 27 and the lower wall 28, the back pressure chamber 32 communicates with the feed pipe 3 through the pipe 23. When the pressure in the space 34 exceeds the pressure in the back pressure chamber 32, the diaphragm valve 29 is moved up to open the third opening 35.

The lower casing portion 22 has a float storage chamber 40, and a communication passage 41. The communication passage 41 is a portion through which the float storage chamber 40 and the space 34 communicate with each other. As described above, the lower wall 28 is formed so as to be integrated with at a front end of the lower casing portion 22. The third opening 35 and a second opening 44 are provided in the lower wall 28 so that the third opening 35 and the second opening 44 are disposed side by side. The second opening 44 communicates with the communication passage 41. Further, an upper bottom plate 47 extending horizontally is integrally formed in an outer circumferential portion located substantially between the openings 35 and 44. As shown in FIG. 1, the upper bottom plate 47 is integrally attached to the bottom of the upper casing portion 21 so as to serve as a bottom plate of the upper casing portion 21. The space 34 closed in the upper casing portion 21 is formed in the condition that the upper bottom plate 47 is attached.

The float storage chamber 40 is a chamber in which a float valve 50 is disposed. A first opening 42 and a first valve seat 43 around the first opening 42 are provided in the top of the float storage chamber 40. The first opening 42 communicates with the communication passage 41. A plurality of side openings 45 are provided in a side wall of the float storage chamber 40. The float storage chamber 40 is also opened downward. After the float valve 50 is stored in the float storage chamber 40, a bottom member 48 having a plurality of bottom openings 49 is integrally attached to the float storage chamber 40. A plurality of vertical ribs 46 are provided on an inner side surface of the float storage chamber 40 so as to be arranged radially at regular intervals to guide the up-down movement of the float valve 50.

The float valve 50 is a member which is made of resin and which is substantially shaped like a hollow cylinder opened downward. In the condition that the bottom member 48 is integrally attached to the float storage chamber 40 while the float valve 50 is stored in the float storage chamber 40, a spring 51 is interposed between the float valve 50 and the bottom member 48 to assist the upward movement of the float valve 50. Although the spring force of the spring 51 is normally incapable of moving the float valve 50 upward, it acts as force added to buoyancy acting on the float valve 50 to allow the float valve 50 to move up quickly when fuel enters the float storage chamber 40. A valve body 52 is mounted on the top of the float valve 50. As a result of the upward movement of the float valve 50, the valve body 52 abuts on the first valve seat 43 to interrupt the communication between the float storage chamber 40 and the communication passage 41. The valve body 52 can be tilted back and forth and left and right. The valve body 52 could be brought into tight contact with the first valve seat 43 well even if the float valve 50 were more or less tilted. The float valve 50, the spring 51 and the valve body 52 provided in the float storage chamber 40 form a liquid level detecting valve 39.

The vaporized fuel processing device A according to the invention operates as follows. When the fuel tank 2 to which the vaporized fuel processing device A is attached is supplied with fuel through the feed pipe 3 shown in FIG. 5, the pressure in the fuel tank 2 increases. As a result, the diaphragm valve 29 of the diaphragm valve unit 26 is pushed up to open the second and third openings 44 and 35. For this reason, fuel vapor produced in the fuel tank 2 flows into the space 34 through the first, second and third openings 42, 44 and 35. The fuel vapor takes a roundabout route in the space 34, flows into the vent passage 24 and reaches a canister 5 via the vent passage 24. The canister 5 adsorbs the fuel vapor. Subsequently, the liquid level of fuel in the fuel tank 2 rises as fuel vapor is discharged from the fuel tank 2. When the liquid level of fuel in the fuel tank 2 finally reaches a full-tank position, the float valve 50 abuts on the first valve seat 43 to stop the discharge of fuel vapor anymore. Thereafter, the pressure in the fuel tank 2 rises further, thereby causing the refueling to stop automatically.

As described above, since the invention employs a structure in which the diaphragm valve unit 26 is disposed in the space 34, the vent passage 24 can be disposed horizontally in the upper portion of the upper casing portion 21 as shown in FIG. 1 or can be easily attached to any other portion of the upper casing portion 21. Accordingly, the degree of freedom in attaching the vaporized fuel processing device A to the fuel tank 2 can be improved greatly.

Figure 3:
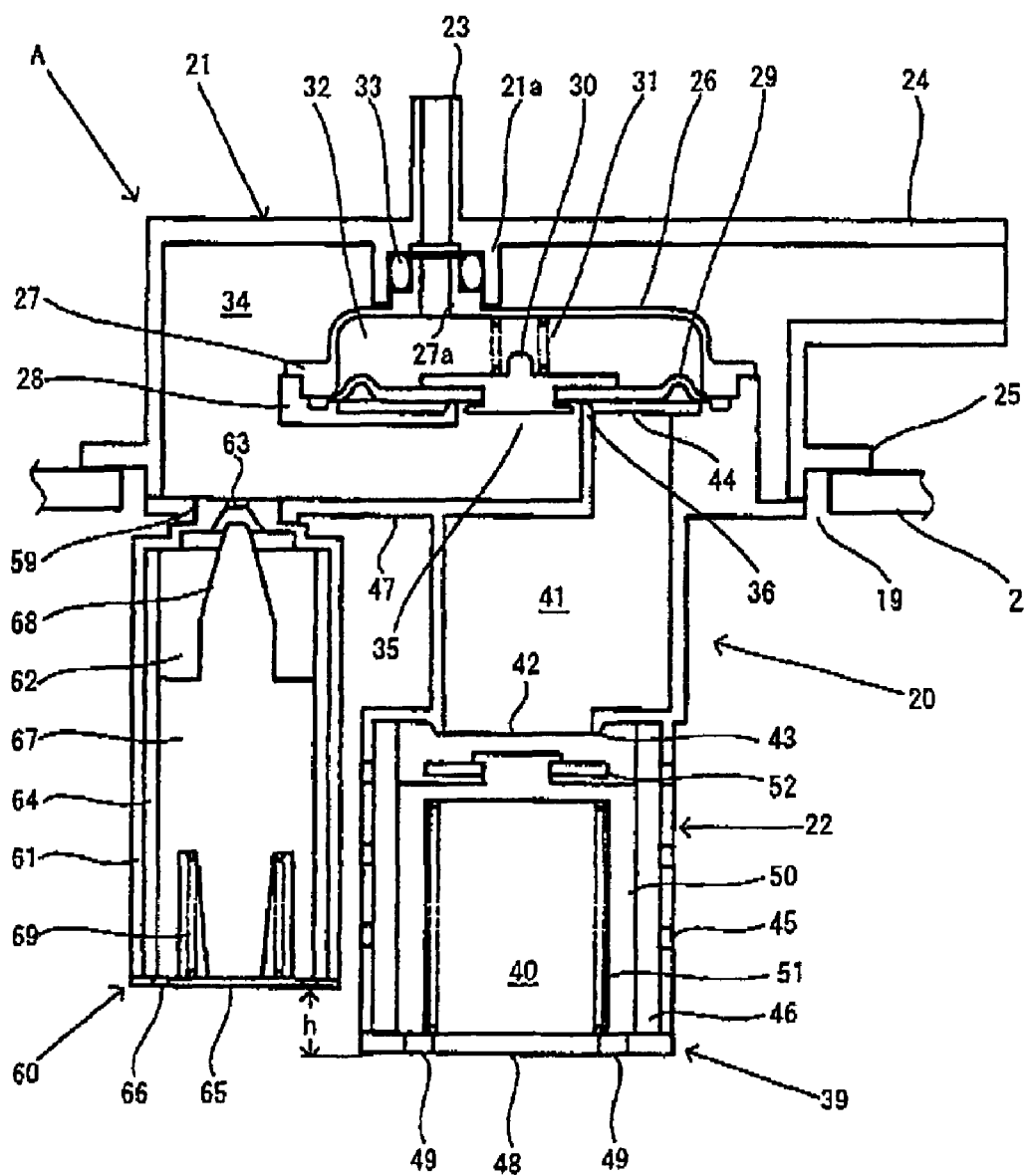
FIG. 3 is a sectional view showing a vaporized fuel processing device according to a third embodiment of the invention.

Fuel vapor once flows into the space 34 through the third opening 35 instead of flowing into the vent passage 24 directly. The fuel vapor takes a roundabout route in the space 34 while colliding with the inner wall of the space 34 and then flows into the vent passage 24. For this reason, even in the case where part of fuel flows out through the third opening 35, the fuel can be prevented from flowing into the canister 5 via the vent passage 24. In this case, a fuel cut valve 60 as shown in FIG. 3 may be provided so that the fuel flowing out into the space 34 can be returned to the fuel tank 2 through a communication hole 63 provided at the top of the fuel cut valve 60.

SECOND EMBODIMENT

Figure 2:
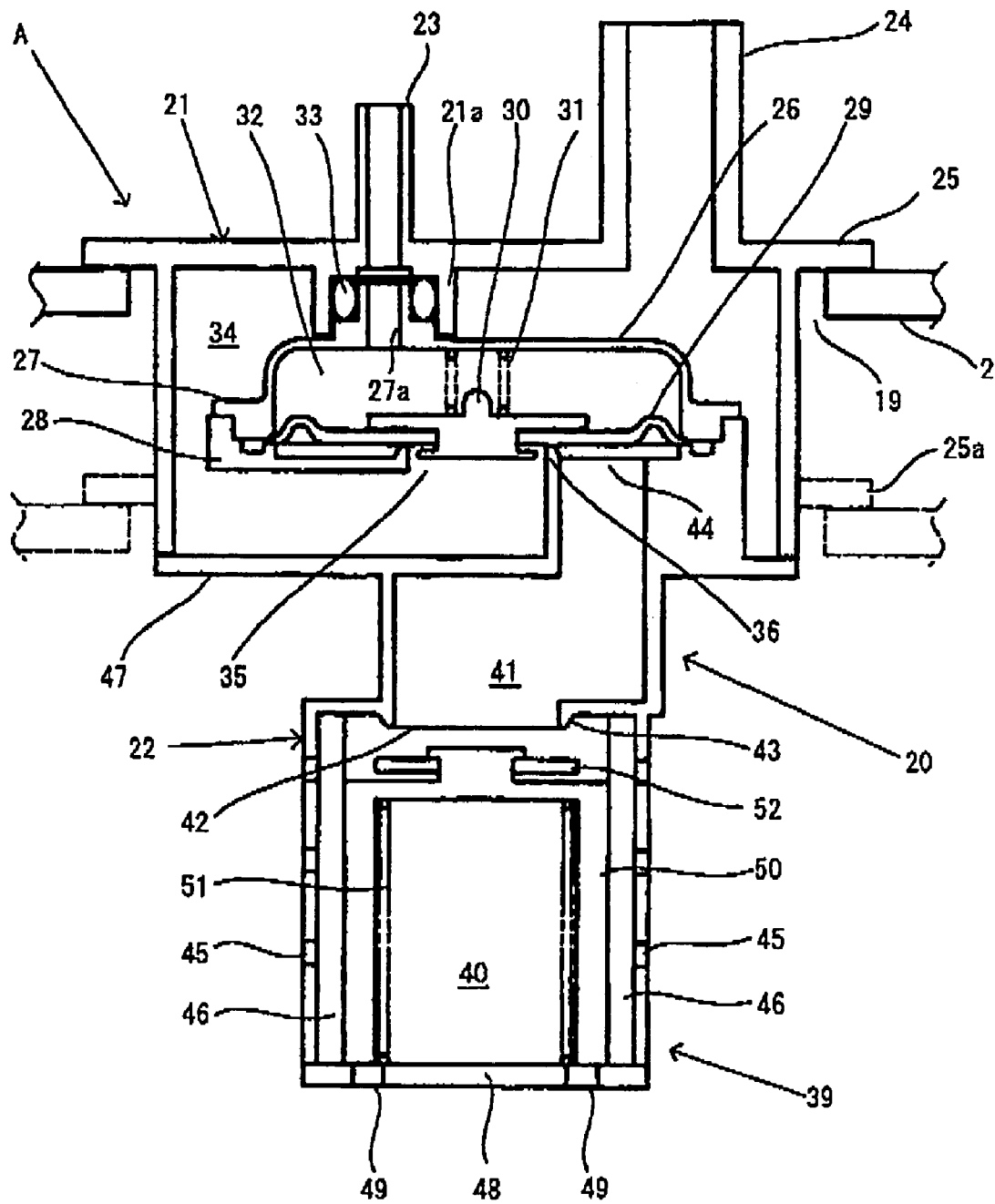
FIG. 2 is a sectional view showing a vaporized fuel processing device according to a second embodiment of the invention.

FIG. 2 shows a vaporized fuel processing device according to a second embodiment of the invention. The vaporized fuel processing device is of the type in which the vaporized fuel processing device is entirely disposed in a fuel tank and in which a vent passage is extended vertically from a space where a diaphragm valve unit is stored. In the following description, parts the same as those in the first embodiment are referred to by numerals the same as those in the first embodiment.

The outer shell of the vaporized fuel processing device A according to this embodiment is formed by a casing 20 made of resin and including an upper casing portion 21 and a lower casing portion 22. The vaporized fuel processing device A further has: a diaphragm valve unit 26 including a diaphragm valve 29 and disposed so as to be stored in a space 34 formed in the casing 20; and a liquid level detecting valve 39 including a float storage chamber 40 containing a float valve 50 and provided in the lower casing portion 22 located below the space 34 through a communication passage 41. The vaporized fuel processing device A as a whole is substantially similar to that in the first embodiment.

In the vaporized fuel processing device A according to this embodiment, a flange 25 for attaching the vaporized fuel processing device A to the fuel tank 2 is provided in an upper portion of a side wall of the upper casing portion 21 so that the vaporized fuel processing device A can be attached to the fuel tank 2 by the flange 25. Accordingly, after attached to the fuel tank 2, the vaporized fuel processing device A is disposed so as to be substantially entirely inserted in the fuel tank 2.

A vent passage 24 is installed vertically at the top of the upper casing portion 21. Incidentally, the flange 25 may be provided in a lower portion of the side wall of the upper casing portion 21 as indicated by reference numeral 25a.

As described above, according to the invention, because the flange 25 for attaching the vaporized fuel processing device A to the fuel tank 2 is provided in the upper portion of the side wall of the upper casing portion 21 so that the vaporized fuel processing device A can be disposed so as to be stored in the fuel tank 2 as sufficiently as possible, the amount of HC which is contained in fuel and which is transmitted through the wall of the vaporized fuel processing device A so as to escape to the outside can be reduced. In addition, the flange 25 for attaching the vaporized fuel processing device A to the fuel tank can be installed in any upper or lower position of the side wall of the casing, so that the degree of freedom in selecting the installation position of the vaporized fuel processing device A can be improved.

In addition, the use of the structure in which the diaphragm valve unit 26 is disposed in the space 34 permits the vent passage 24 to be disposed vertically at the top of the upper casing portion 21 as shown in FIG. 2 or to be easily installed in any other position of the upper casing portion 21. As a result, the degree of freedom in attaching the vaporized fuel processing device A to the fuel tank 2 can be improved more greatly.

THIRD EMBODIMENT

FIG. 3 shows a vaporized fuel processing device according to a third embodiment of the invention. The vaporized fuel processing device is of the type in which a fuel cut valve is further disposed in a lower portion of a space containing a diaphragm valve unit, in addition to the configuration of the first embodiment. In the following description, parts the same as those in the first embodiment are referred to by numerals the same as those in the first embodiment.

The outer shell of the vaporized fuel processing device A according to this embodiment is also formed by a casing 20 made of resin and including an upper casing portion 21 and a lower casing portion 22. The vaporized fuel processing device A also has: a diaphragm valve unit 26 including a diaphragm valve 29 and disposed so as to be stored in a space 34 formed in the casing 20; and a liquid level detecting valve 39 including a float storage chamber 40 containing a float valve 50 and provided in the lower casing portion 22 located below the space 34 through a communication passage 41. The vaporized fuel processing device A as a whole is substantially similar to that in the first embodiment.

In the vaporized fuel processing device A according to this embodiment, a fuel cut valve 60 is provided under the upper bottom plate 47 of the lower casing portion 22 so as to be disposed side by side with the liquid level detecting valve 39.

The fuel cut valve 60 includes a casing 61, a float 67, and a spring 69. The casing 61 is a member made of resin and substantially shaped like a hollow cylinder opened downward. A float storage chamber 62 is disposed in the casing 61. The bottom of the casing 61 is opened. The top of the casing 61 is provided with a communication hole 63. The casing 61 is integrally attached to a mounting hole 59 formed in the lower surface of the upper bottom plate 47 of the lower casing portion 22, so that the float storage chamber 62 and the space 34 communicate with each other through the communication hole 63. Incidentally, the size of the communication hole 63 is considerably smaller than that of each of the first, second and third openings 42, 44 and 35.

A bottom member 65 having a plurality of bottom openings 66 is integrally attached to the open portion at the lower end of the casing 61 to form the float storage chamber 62 in the inside of the casing 61. A plurality of vertical ribs 64 are provided on an inner side surface of the casing 61 so as to be arranged radially at regular intervals to guide the up-down movement of the float 67.

The float 67 is a member which is made of resin and which is substantially shaped like a cylinder. In the condition that the bottom member 65 is integrally attached to the casing 61 while the float 67 is stored in the casing 61, the spring 69 is interposed between the float 67 and the bottom member 65 to assist the upward movement of the float 67. Although the spring force of the spring 69 is normally incapable of moving the float 67 upward, it can move the float 67 upward quickly to block the communication hole 63 when the vehicle tilts or falls down sidelong. A valve body 68 is integrally formed at the top of the float 67. As a result of the upward movement of the float 67, the valve body 68 abuts on the communication hole 63 to interrupt the communication between the float storage chamber 62 and the space 34. Incidentally, the bottom member 65 of the fuel cut valve 60 is provided in a position higher by $\underline{h}$ than a bottom member 48 of the liquid level detecting valve 39 as shown in FIG. 3.

The fuel cut valve 60 is provided so that the fuel tank 2 and the atmospheric air always communicate with each other through the small-diameter communication hole 63 to eliminate fluctuation of the pressure in the fuel tank 2. For this purpose, the fuel cut valve 60 is provided in a position higher by $\underline{h}$ than the bottom member 48 of the liquid level detecting valve 39 as shown in FIG. 3. Even in the case where the pressure in the fuel tank 2 changes to a negative pressure, for example, because of reduction in temperature in the condition that the fuel tank 2 is filled up with fuel so that the liquid level detecting valve 39 is blocked, the atmospheric air is introduced into the fuel tank 2 through the communication hole 63 to eliminate fluctuation of the pressure in the fuel tank 2. When the vehicle tilts or falls down sidelong, the float 67 is moved up quickly to block the communication hole 63 to thereby prevent fuel in the fuel tank 2 from flowing out toward the canister.

According to this embodiment, since the fuel cut valve 60 is provided under the upper bottom plate 47 of the lower casing portion 22, the fuel cut valve can be installed in any position except the communication passage 41 of the upper bottom plate 47. Accordingly, the degree of freedom in selecting the installation position of the fuel cut valve 60 can be improved.

FOURTH EMBODIMENT

Figure 4:
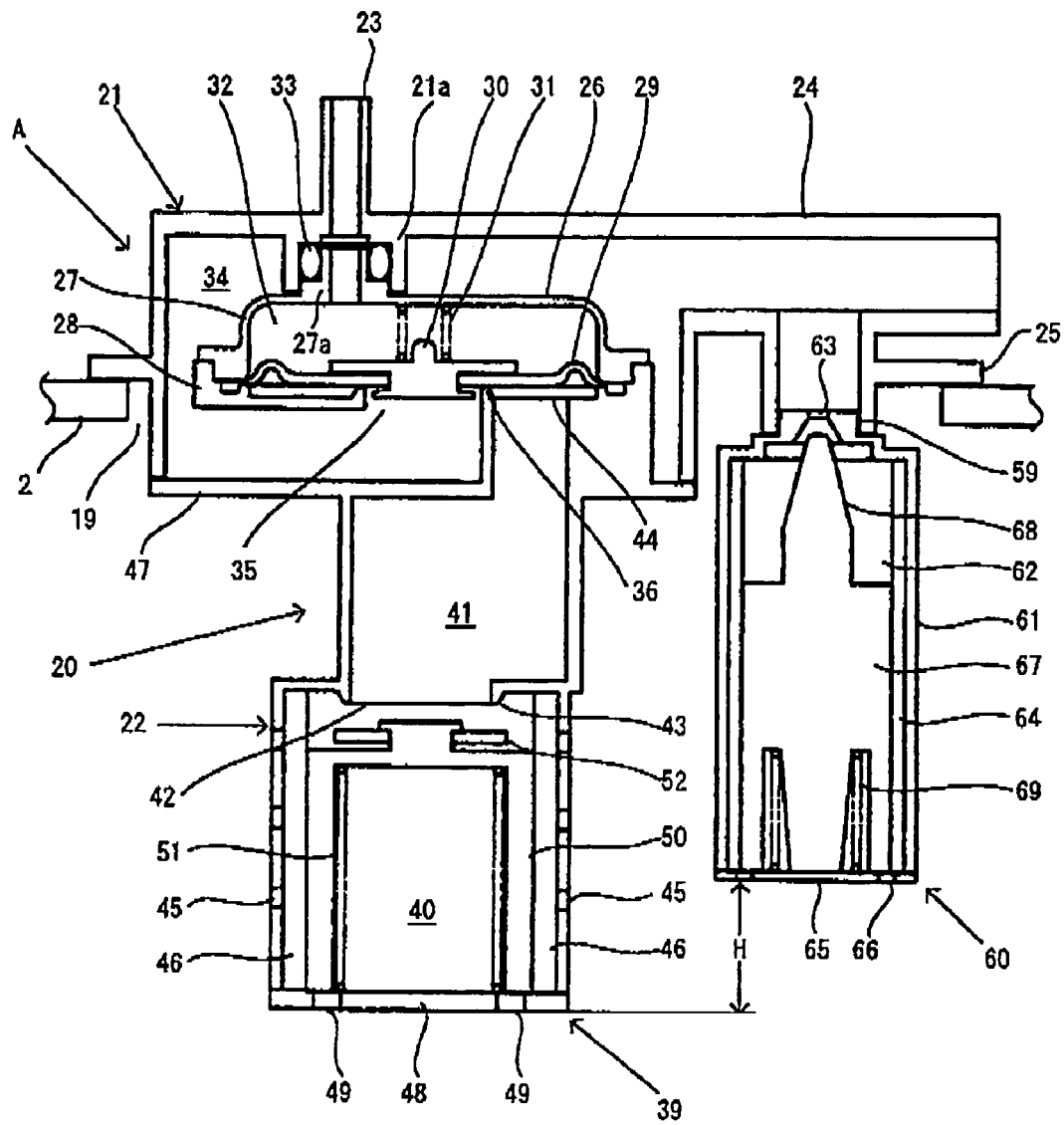
FIG. 4 is a sectional view showing a vaporized fuel processing device according to a fourth embodiment of the invention.

FIG. 4 shows a vaporized fuel processing device according to a fourth embodiment of the invention. The vaporized processing device is of the type in which a fuel cut valve as provided in the third embodiment is provided in the vent passage. In the following description, parts the same as those in the first embodiment are referred to by numerals the same as those in the first embodiment.

The outer shell of the vaporized fuel processing device A according to this embodiment is also formed by a casing 20 made of resin and including an upper casing portion 21 and a lower casing portion 22. The vaporized fuel processing device A also has: a diaphragm valve unit 26 including a diaphragm valve 29 and disposed so as to. be stored in a space 34 formed in the casing 20; and a liquid level detecting valve 39 including a float storage chamber 40 containing a float valve 50 and provided in the lower casing portion 22 located below the space 34 through a communication passage 41. The vaporized fuel processing device A as a whole is substantially similar to that in the first embodiment.

In the vaporized fuel processing device A according to this embodiment, a fuel cut valve 60 is provided in a lower surface of a vent passage 24 so as to be disposed side by side with the liquid level detecting valve 39. Because the configuration of the vaporized fuel processing device A is the same as that in the third embodiment, the description thereof will be omitted.

Because the fuel cut valve 60 is provided in the lower surface of the vent passage 24, a bottom member 65 which forms the bottom of the fuel cut valve 60 can be provided in a position at a distance H from a bottom member 48 of the liquid level detecting valve 39 as shown in FIG. 4. Incidentally, the distance H is larger than $\underline{h}$ shown in FIG. 3. Accordingly, when the fuel tank 2 is filled up, fuel can be more surely prevented from exerting a harmful influence on the communication hole 63 blocked with a valve body 68 of the fuel cut valve 60. In addition, since the fuel cut valve 60 can be installed even in the case where the lower casing portion 22 has no space for installation of the fuel cut valve 60, the degree of freedom in designing is improved more greatly.

The invention is not limited to the configurations of the embodiments, and modifications maybe made suitably without departing from the gist of the invention.

According to the invention, the diaphragm valve unit is disposed in the space formed in the casing of the vaporized fuel processing device, and the vent passage is provided to communicate with the space formed in the casing of the vaporized fuel processing device. Accordingly, the vent passage communicating with a canister can be installed in any position, e.g., a position horizontal or vertical to the space, so that the degree of freedom in selecting the installation position of the vent passage can be improved. Even if part of fuel in the fuel tank leaked out from an opening, the leakage fuel could be prevented from flowing up to the canister. Accordingly, the canister can be prevented from being deteriorated by the leakage fuel.

According to the invention, the vaporized fuel processing device may be disposed in the fuel tank. Accordingly, the amount of protrusion of the vaporized fuel processing device from the top of the fuel tank can be reduced, so that the degree of freedom in selecting the installation position of the fuel tank can be improved. Although HC in fuel is apt to be transmitted through the wall of the vaporized fuel processing device to escape to the outside, the amount of HC transmitted to the outside can be reduced because a major part of the vaporized fuel processing device is located inside the fuel tank.

According to the invention, the flange for attaching the vaporized fuel processing device to the fuel tank may be provided in the casing of the vaporized fuel processing device. This means that the flange for attaching the vaporized fuel processing device to the fuel tank can be installed in any upper or lower position of the casing. Accordingly, the degree of freedom in selecting the installation position of the vaporized fuel processing device can be improved.

According to the invention, the fuel cut valve may be mounted in the space formed in the casing of the vaporized fuel processing device. This means that the fuel cut valve can be installed in any position in the space. Accordingly, the degree of freedom in selecting the installation position of the fuel cut valve can be improved.

According to the invention, the fuel cut valve may be mounted in the vent passage. This means that the fuel cut valve can be installed in any other portion than the space. Accordingly, the degree of freedom in selecting the installation position of the fuel cut valve can be improved. In addition, since the installation position of the fuel cut valve can be set at a position higher than the liquid level detecting valve, the pressure in the fuel tank can be adjusted by the fuel cut valve even in the case where the fuel tank is filled up with fuel. Accordingly, a harmful influence on deformation of the fuel tank can be prevented.

What is claimed is:

1. A vaporized fuel processing device attached to a fuel tank, said device comprising:
    a casing for forming an outer shell of said vaporized fuel processing device;
    a fuel cut valve mounted to the casing; and
    a diaphragm valve unit opened at the time of increasing pressure in the fuel tank,
    wherein said diaphragm valve unit is disposed in and surrounded on at least three sides by a space defined in said casing, and
    wherein a portion of the space is disposed directly between the fuel cut valve and the diaphragm valve unit and a remaining portion of the space is located directly next to at least one side of the diaphragm valve unit and directly above an upper surface of the diaphragm valve unit.

2. A vaporized fuel processing device according to claim 1, further comprising:
    a vent passage communicating with atmospheric air, wherein said vent passage communicates with the space.

3. A vaporized fuel processing device according to claim 1, wherein said vaporized fuel processing device is disposed in the fuel tank.

4. A vaporized fuel processing device according to claim 1, wherein said casing includes a flange provided for attaching said casing to the fuel tank.

5. A vaporized fuel processing device according to claim 3, wherein said casing includes a flange provided for attaching said casing to the fuel tank.

6. A vaporized fuel processing device according to claim 2, further comprising:
    a fuel cut valve mounted in said vent passage.

7. A vaporized fuel processing device according to claim 2, wherein said vent passage is extended horizontally from the space where said diaphragm valve unit is stored.

8. A vaporized fuel processing device according to claim 2, wherein said vent passage is extended vertically from the space where said diaphragm valve unit is stored.

9. A vaporized fuel processing device according to claim 1, further comprising:
    a liquid level detecting valve for detecting a fuel level in the fuel tank, said liquid level detecting valve communicating with the space, wherein a bottom of said fuel cut valve is provided in a position higher than a bottom of said liquid level detecting valve in the fuel tank.

10. A vaporized fuel processing device according to claim 6, further comprising:
    a liquid level detecting valve for detecting a fuel level in the fuel tank, said liquid level detecting valve communicating with the space,
    wherein a bottom of said fuel cut valve is provided in a position higher than a bottom of said liquid level detecting valve in the fuel tank.

11. A vehicle comprising:
    a fuel tank;
    a canister; and
    a vaporized fuel processing device disposed between said fuel tank and said canister, said device including:
        a casing for forming an outer shell of said vaporized fuel processing device,
        a fuel cut valve mounted to the casing, and
        a diaphragm valve unit opened at the time of increasing pressure in said fuel tank,
    wherein said diaphragm valve unit is disposed in and surrounded on at least three sides by a space defined in said casing, and
    wherein a portion of the space is disposed directly between the fuel cut valve and the diaphragm valve unit and a remaining portion of the space is located directly next to at least one side of the diaphragm valve unit and directly above an upper surface of the diaphragm valve unit.

12. A vehicle according to claim 11, wherein said vaporized fuel processing device further includes a vent passage communicating with atmospheric air via said canister, and wherein said vent passage communicates with the space.

13. A vehicle according to claim 11, wherein said vaporized fuel processing device is disposed in said fuel tank.

14. A vehicle according to claim 12, wherein said vaporized fuel processing device further includes a fuel cut valve mounted in said vent passage.

15. A vehicle according to claim 11, wherein said vaporized fuel processing device further includes a liquid level detecting valve for detecting a fuel level in the fuel tank, said liquid level detecting valve communicating with the space, and wherein a bottom of said fuel cut valve is provided in a position higher than a bottom of said liquid level detecting valve in said fuel tank.

16. A vehicle according to claim 14, wherein said vaporized fuel processing device further includes a liquid level detecting valve for detecting a fuel level in the fuel tank, said liquid level detecting valve communicating with the space, and wherein a bottom of said fuel cut valve is provided in a position higher than a bottom of said liquid level detecting valve in said fuel tank.

* * * * *